United States Patent Office

2,945,781
Patented July 19, 1960

2,945,781

METHOD OF CONTROLLING NEMATODES EMPLOYING ALKALI METAL SALT OF N-(n-PROPYL) DITHIOCARBAMATE

Philip H. Santmyer, Florissant, Mo., assignor to Monsanto Chemical Company, St. Louis, Mo., a corporation of Delaware No Drawing. Filed Dec. 12, 1958, Ser. No. 779,812

4 Claims. (Cl. 167—22)

This application relates to nematocides which are non-phytotoxic. More specific, the invention is directed to certain derivatives of dithiocarbamic acids which have a very desirable combination of properties.

Although it is well recognized that the respective metabolisms of nematodes and plants are very different and there is no general correlation between the respective effects of chemical toxicants, it is recognized that plants are more sensitive and a wider variety of substances are known as herbicides than are available as nematocides. Many of the very active nematocides have toxic or inhibitory effects on plant growth, although they may not in many instances be sufficiently toxic to be useful as herbicides. Some nematocidal compounds are very highly toxic to many different forms of life and are therefore useful as soil sterilants in the destruction of insect larva, weed seeds, bacteria and soil fungus as well as nematodes. However, there are limitations on the use of soil sterilants.

A chemical adapted to sterilize soils and which destroys seeds or plants preemergently will frequently render the soil incapable of being used for agriculture. Most of the organic chemicals so used are subject to bacterial attack and the toxicity is eventually minimized. This, however, will often require several weeks before the crop can be planted. Since the bacterial attack of the toxicants is not extensive until the soil is warmed by the advancing season, it is evident that the time required to minimize or eliminate the toxic content of the soil represents a loss of growing time. This can be a serious limitation on effective use in most temperate zone agricultural areas. It is evident that there is an urgent need for nematocides which are not also herbicidal.

Some, but not all derivatives of dithiocarbamic acid are known to have biologically toxic properties. When the structural configuration of the dithiocarbamic acid is such that the compound can penetrate the usually impervious protective covering of the nematode and attack the essential enzymes of the animal, it invariably has some inhibitory activity on plants. For example, U.S. Patent 2,766,554, describes a method of sterilizing soils by treating with the sodium salt (or other metal salt) of N-methyldithiocarbamic acid. This patent demonstrates that the N-methyl and N-ethyl derivatives are both nematocidal and herbicidal, whereas higher derivatives including N,N-dimethyl, N,N-diethyl and N-isopropyl derivatives are without effect.

The purpose of this invention is to provide an effective nematocide which has no herbicidal or plant inhibitory effects. A further purpose is to provide a useful control of nematode populations without sacrificing a portion of the growing season. A still further purpose is to provide a dithiocarbamate which has unexpected soil treating properties.

In accordance with this invention, it has been found that the alkali metal N-(n-propyl) dithiocarbamate has substantial nematocidal value but is non-phytotoxic at conventional levels of application.

The nematocidal compounds may be added to the soil in solid formulations, frequently referred to as dusts, which may contain in addition to the active ingredient, diluents or extenders to adsorb the readily volatile toxicant and thereby prevent the too rapid dissipation, and dispersing agents to prevent local high concentrations. In addition these components facilitate the distribution of the active ingredient in soil or soil waters.

Suitable solid diluents are those which render the compositions dry and permanently free-flowing. Thus hydroscopic materials should be avoided. Effective solid diluents are the finely divided carriers, including the clays such as the kaolinites, the bentonites and the attapulgites; other minerals in natural state, such as talc, pyrophyllite, quartz, diatomaceous earth, fuller's earth, chalk, rock phosphate and sulfur; and chemically modified minerals, such as acid washed bentonites, precipitated calcium phosphates, precipitated calcium carbonate and colloidal silica. These diluents may represent a substantial portion, for example 50 to 98 percent by weight of the entire formulations.

Liquid compositions for nematocidal uses may be solutions or liquid dispersions. The choice of the liquid medium will depend to a great extent upon the physical properties of the active ingredient. If the substituted nitriles are water-soluble, the liquid compositions may be merely an aqueous solution. Where the active component is insoluble in water or soluble only to a limited extent, it is frequently desirable to add a small amount of an organic solvent which can be readily dispersed in the aqueous medium to produce a heterogenous dispersion of the active ingredient in water.

A valuable class of nematocidal formulations are those wherein there is present a surface active agent, which serves in providing formulations capable of being uniformly distributed in the soil. The surface active agents may be anionic, cationic or non-ionic and include conventional soaps, such as the water-soluble salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface actve agents will be only a minor portion of the formulations as used, for example less than 10 percent and frequently as low as 0.05 percent. In general, concentration of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil.

A useful formulation of the nematocidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil being treated. For this purpose readily flowable compositions are required, either liquid or solid in physical state. Thus a critical aspect of the invention is the fluent carrier by use of which optimum nematocidal effects can be obtained.

Although the sodium N-(n-propyl) dithiocarbamate may be used in the pure state, it appears that more effective utilization of the active component is obtained when formulated with the conditioning agents as described.

Although the nematocidal compounds may be used in formulations as described above, it is often more convenient to use the toxicants in their free state. Since many of the compositions are relatively volatile liquids, they may be injected into the soil using regularly spaced injections of such size and distribution so that the entire volume of soil to be treated will contain an effective concentration of the toxicant.

Some of the compounds, the use of which is included within the scope of this invention, have other beneficial effects on the soil, for example insect eggs and larvae may be destroyed or their population reduced. Also many other undesirable organisms, such as weed seeds and fungi, will be destroyed or their vitality seriously affected by treating the soil with the polyhalopropionitriles.

Further details of the practice of this invention are set forth with respect to the following examples.

Example 1

Sample bottles of aqueous solutions containing various concentrations of sodium N-(n-propyl) dithiocarbamate were prepared. Similar solutions of sodium N-(methyl) dithiocarbamates were prepared. In each bottle three week old tomato plants were placed and a counted number (100) of nematodes (Pangrellus sp.) deposited. After exposure for 72 hours the nematodes were counted and the plants examined for evidence of phytotoxicity. The following observations were made.

| Concentration of Reagents | Sodium N-(Methyl) Dithiocarbamates | | Sodium N-(n-Propyl) Dithiocarbamates | |
|---|---|---|---|---|
| | Plant | N. Alive | Plant | N. Alive |
| 0.005 | dead | none | alive | none. |
| 0.002 | dead | none | alive new roots | none. |
| 0.001 | dead | none | alive new roots | 22. |

These experiments demonstrate that at the practicable levels of application shown the sodium N-(methyl) dithiocarbamate destroys both nematodes and plants but the sodium N-(n-propyl) dithiocarbamate destroys the nematodes without injuring the plant.

Example 2

The nematocidal effects of various homologues of the sodium N-(n-propyl) dithiocarbamates were examined by exposing the nematodes (Pangrellus sp.) to various concentrations of the different sodium alkyl dithiocarbamates and observing the toxic effects as evidenced by the reduced rate of flexing (motility).

| Time | Alkyl ester at 0.1 conc. | | | | |
|---|---|---|---|---|---|
| | Methyl | n-propyl | isopropyl | n-butyl | t-butyl |
| | Percent | Percent | Percent | Percent | Percent |
| 10 min | 20 | 25 | 100 | 100 | 100 |
| 20 min | 10 | 10 | 100 | 100 | 100 |
| 30 min | 7 | 10 | 100 | 100 | 90 |
| 60 min | 1 | 5 | 100 | 100 | 90 |
| 2 hours | 0 | 3 | 100 | 100 | 90 |
| 24 hours | 0 | 0 | 2 | 25 | 90 |

| Time | Alkyl ester at 0.01 | | | | |
|---|---|---|---|---|---|
| | Methyl | n-propyl | isopropyl | n-butyl | t-butyl |
| | Percent | Percent | Percent | Percent | Percent |
| 10 min | 100 | 100 | 100 | 100 | 100 |
| 20 min | 100 | 100 | 100 | 100 | 100 |
| 30 min | 90 | 90 | 100 | 100 | 100 |
| 60 min | 90 | 90 | 100 | 100 | 100 |
| 2 hours | 50 | 90 | 100 | 100 | 100 |
| 24 hours | 0 | 0 | 100 | 100 | 100 |

This experimental data shows that the sodium N-methyl-dithiocarbamate and the sodium N-(n-propyl) dithiocarbamate are of the same order to activity as nematocides whereas the near homologues, the isopropyl and n-butyl esters are of little or no activity as practicable nematocides.

Example 3

A sandy loam soil infested with the root knot nematode (Meloidogyne incognita acrita) was packed in cheese cloth bags which were buried in the same soil at depths up to 10 inches and lateral distances up to 4 inches from a predetermined point of injection. One ml. of a 20 percent aqueous solution of sodium N-(n-propyl) dithiocarbamate was injected at an eight inch depth. The soil bed was maintained for seven days at 78° F. The soil from the several cheesecloth bags was transferred to pots and planted with tomato seedlings. After four weeks the plants were examined for root galls, none of which were found. There was also no evidence of phytotoxicity in any of the tomato plants.

Similar experiments using 4 ml. of a 30% concentrate of sodium N-methyl dithiocarbamate were made. Good control of nematodes was had in soil samples treated at less than four inches from the point of injection. However, at four inches and at more distant points poor or no control of nematodes was effected.

These experiments clearly indicate that the N-propyl derivative provides better permeation through the soil and better activity against nematodes located farther away from the points of injection.

Example 4

Additional growing experiments were conducted by treating nematode infested soils with each of the methyl and n-propyl derivatives of sodium dithiocarbamate. Soil samples were treated with 0.1 g. of toxicant per pint of soil and also with 0.01 g. of toxicant per pint of soil. Tomato seedlings were planted in each of the soils and the nematocidal effects determined by counting the root galls. At both concentration levels the sodium n-methyl-dithiocarbamate caused phytotoxic effects whereas the sodium N-(n-propyl) dithiocarbamate did not exhibit evidence of phytotoxicity. At heavier concentration level complete control of nematodes was affected by both toxicants. At the lighter level of application, some replications of the sodium N-(n-propyl) dithiocarbamate showed complete control and others the control was not quite complete. The sodium N-methyl dithiocarbamate showed not quite complete control in all replications.

The above growing tests show that in soil the normal propyl derivative is superior with respect to the lack of phytotoxicity and is at least as good as a nematocide within the concentrations specified.

The experimental data above reproduced indicates that at concentrations of 0.001 and 0.1 percent sodium N-(n-propyl) dithiocarboamate is a useful nematocide and that over a substantial portion of the nematocidally active range little or no phytotoxic effects are observed. The useful ranges of the sodium N-(n-propyl) dithiocarbamate for nematode control will vary somewhat with the growing crop, but in general there will be a practical range of concentrations where no herbicidal effects will take place. The more effective usage involves the application of from 50 to 300 pounds per acre.

What is claimed is:

1. The method of controlling nematodes in soils wherein crops are growing which comprises applying to the said soil an alkali metal salt of N-(n-propyl) dithiocarbamate at a nematocidal level of application below the threshold of phytotoxicity level.

2. The method of controlling nematodes in soils wherein crops are growing which comprises adding of sodium N-(n-propyl) dithiocarbamate at a nematocidal level of application below that at which phytotoxicity is effected.

3. The method of controlling nematodes in soils wherein crops are growing which comprises adding an aqueous solution of sodium N-(n-propyl) diethiocarbamate at a concentration of 0.001 to 0.10 percent by weight.

4. The method of controlling nematodes in soils wherein crops are growing which comprises adding from 20 to 300 lbs. per acre of sodium N-(n-propyl) dithiocarbamate in aqueous solution of concentration between 0.001 to 0.10 percent by weight.

References Cited in the file of this patent

UNITED STATES PATENTS

| | | |
|---|---|---|
| 2,677,698 | Deutschman | May 4, 1954 |
| 2,766,554 | Dorman | Oct. 16, 1956 |

FOREIGN PATENTS

| | | |
|---|---|---|
| 228,387 | Switzerland | Nov. 16, 1943 |
| 233,721 | Switzerland | Nov. 16, 1944 |
| 742,185 | Germany | Nov. 27, 1943 |